United States Patent [19]

Mouille

[11] Patent Number: 5,316,442
[45] Date of Patent: May 31, 1994

[54] ARTICULATED ROTOR HEAD FOR GYROPLANES

[75] Inventor: René L. Mouille, Aix-En-Provence, France

[73] Assignee: Aerospatiale Societe Nationale Industrielle, Paris, France

[21] Appl. No.: 994,749

[22] Filed: Dec. 22, 1992

[30] Foreign Application Priority Data

Dec. 27, 1991 [FR] France .................. 91 16220

[51] Int. Cl.⁵ .............................................. B64C 27/48
[52] U.S. Cl. .................. 416/134 A; 416/140; 416/141
[58] Field of Search ............... 416/103, 104, 105, 106, 416/107, 134 A, 140, 141

[56] References Cited

U.S. PATENT DOCUMENTS

| | | | |
|---|---|---|---|
| 4,203,709 | 5/1980 | Watson | 416/134 A |
| 4,257,739 | 3/1981 | Covington et al. | 416/134 A |
| 4,306,836 | 12/1981 | Mayerjak | 416/134 A |
| 4,365,936 | 12/1982 | Hatch | 416/134 A |
| 4,373,862 | 2/1983 | Ferris et al. | 416/134 A |
| 4,512,717 | 4/1985 | Pancotti et al. | 416/134 A |
| 4,585,394 | 4/1986 | Schwarz et al. | 416/134 A |
| 4,732,540 | 3/1988 | Mouille et al. | 416/134 A |
| 4,749,339 | 6/1988 | Mouille et al. | 416/140 A |
| 5,135,357 | 8/1992 | Pancotti | 416/134 A |

FOREIGN PATENT DOCUMENTS 0331791 9/1989 European Pat. Off. .
2427251 12/1979 France .
2040850 9/1980 United Kingdom .

Primary Examiner—Edward K. Look
Assistant Examiner—James A. Larson
Attorney, Agent, or Firm—Nikaido, Marmelstein, Murray & Oram

[57] ABSTRACT

The invention relates to an articulated rotor head for gyroplanes comprising a rigid central hub body (1), perpendicularly integrated with a drive shaft (2), each blade (3) being radially fixed to the hub body (1) by means of connecting and articulating components. These components each comprise:

a spherical laminated elastomer stop (4) housed in the central hub body;

a hollow sleeve (5) rigidly locked to the spherical laminated stop (4);

an elastic return and drag damping brace (9) of the blade (3) arranged between the sleeve and the outer part of the rigid hub body (1) on a contiguous sleeve;

a connecting and pitch articulation spindle (6) of the blade (3) connected to the foot of the blade (3) and a pitch lever (8) rigidly locked to the spindle (6) and which swivels about the pitch axis inside the sleeve (5) on two bearings, one of which at least forms a thrust stop (7) to transmit, from the spindle (6) in the sleeve (5), the thrust loads originating from the centrifugal forces on the blade (3).

31 Claims, 5 Drawing Sheets

ARTICULATED ROTOR HEAD FOR GYROPLANES

BACKGROUND OF THE INVENTION

This invention relates to an articulated rotor head for gyroplanes, comprising a rigid central hub body which is perpendicularly integrated into a drive shaft. Each blade of this rotor head is fixed radially to the hub body by means of connecting and articulating components. In accordance with the invention, the rotor head, articulated in pitch, beating and drag, is intended particularly for an helicopter.

Many articulated rotor heads for gyroplanes are already known, especially those developed by the Applicant and filed under French patents numbers 2 427 251, 2 456 034, 2 516 891, 2 584 995 and 2 584 996. While this type of hub achieved great simplicity of design, especially with respect to its integrated mast-hub shape, it does however include a number of sensitive parts. Indeed, a spherical laminated elastomer stop provides by itself, in the presence of the centrifugal forces generated by the blade and which subject it to compression, the beating, drag and pitch control articulation functions of the blade. Thus the spherical laminated elastomer stop is one of the main elements in the definition of the hub and governs its dimensioning. Another sensitive point concerning this type of rotor head is the presence, for each rotor, of an elastic return brace with incorporated damper which controls the angular movements of the blade within its plane and ensures the stability of the rotor when it encounters phenomena of ground and air resonance. This elastic return brace with incorporated damper follows the beating, drag, and pitch control movements of the coupling sleeve of the corresponding blade. This results in pitch-drag couplings which in particular generate increased forces on the controls. Moreover, this brings about large angular movements on the trunnions on the ends of the elastic return brace with incorporated damper that are detrimental to the long service life of these components, and which also have to withstand heavy static and dynamic radial forces.

For the working conditions of the present generation of helicopters, these problems can be solved relatively easily using these types of rotor which then provide suitable in-service strength. Nevertheless, rotary wing aircraft development over the next few years will certainly result in enhanced in-flight performance, particularly with respect to speed, subjecting rotor hubs to even greater stress and strain. In particular, variations in collective pitch and cyclical pitch will increase significantly, and problems to do with the endurance strength of spherical laminated stop and the trunnions of the elastic return and drag damper braces of the blade will become more acute.

To meet these requirements, solutions have been proposed for articulated rotors based on a combination of several types of thrust stop for each blade, as for example contained in European patent 150 331 791 and in U.S. Pat. No. 4,203,708.

European patent 0 331 791 relates to a structure in which the hub body is connected to the top of the mast by means of a single central spherical laminated trunnion. For each blade, the hub body carries a spindle integrated with the hub body, on which is mounted a connecting sleeve to the blade. This sleeve is mounted on the spindle by means of two bearings and a laminated thrust stop in the shape of a flat crown interposed between the spindle and the sleeve. In this patent, the central spherical laminated trunnion allows limited angular oscillations about the center of this trunnion, thus reducing in this so-called "rigid" type of rotor the anchoring moment of the hub on the mast. This type of single trunnion therefore allows only trimming of the whole rotor, but has the drawback of never permitting individual beating, drag and pitch angular blade movements.

Moreover, this central laminated trunnion is not affected by the centrifugal forces generated by the blades, which balance out from one blade to the others through the outer armature of this central trunnion. In this type of assembly, the pitch control is mounted on the sleeve which is outside the spindle. In this arrangement, the outside sleeve is acted upon by the pitch control, but does not receive any beating and drag movements, which are ensured by the flexibility of the blade neck. The drawbacks mentioned above concerning pitch control via the sleeve are encountered once again. In fact, the main objective of the invention described in this document would appear to be the embodiment of the hub, in which the combination of two laminated stops provides a seal against oil leakage.

U.S. Pat. No. 4,203,708 relates to an articulated rotor head in which each blade is fixed to the hub body by means of two laminated thrust stops: one spherical and one flat. In such embodiment, a connecting sleeve is arranged between the blade and the set of stops, the pitch control being mounted directly on this connecting sleeve. Thus in this type of assembly, the two thrust stops are coupled together and work in series on the same spindle which is arranged at the inner end of the connecting sleeve. For this reason, this structure does not separate the beating and pitch control functions into two different parts and therefore subjects the damper, the inner end of which is connected to the hub body, and outer end to the foot of the blade, to large drag-pitch forces. Indeed, the pitch changes cause the damper coupling point next to the blade to turn in the arc of a circle and consequently lead to variations in the distance between the damper fastening points on the blade and hub sides. This results in dynamic parasitic movements of the damper, as well as large movements of the trunnions located at the fastening points of this damper. In addition, this hub arrangement makes it difficult to provide bottom stops that allow the blade to be maneuvered in pitch over all the permitted range when the rotors are stopped and the blades resting on their stops, in order to test the free movement of flight controls before starting to rotate the rotors, as required by flight safety rules. In this case, in fact, each blade-carrying spindle turns about its longitudinal axis and the bottom stop device must permit this free rotation, while the contact point on them is heavily loaded by the resumption of the momentum of the weight of the blade, whose center of gravity is moved several meters further away. Finally the two laminated thrust stops in this structure are arranged inside the hub body, which means that it is not easy to determine their state for inspections without first dismantling the assembly.

OBJECTS AND SUMMARY OF THE INVENTION

The object of this invention is to provide an articulated rotor head in which each blade is connected to the hub body by means of a spherical laminated stop which improves the service life of the spherical laminated stop by limiting the angular deflections exerting force on it solely to the beating and drag deflections of the blades by transferring the deflections required for pitch control to another element of the hub embodiment. Another object of the invention is to propose an embodiment which makes it possible to substantially reduce angular forces exerted on the attachment trunnions and the elastic return and drag damper element of each blade, and thereby increase their service life.

According to one embodiment of the invention, the articulated rotor head for gyroplanes comprises a central rigid hub body, perpendicularly integrated with a drive shaft, each blade being radially fixed to the hub body by means of connecting and articulating components. These components each comprise:

a spherical laminated elastomer stop comprising two rigid braces between which alternate concentric and spherical layers of elastic and rigid materials, the stop being housed in an opening made in the rigid part of the central hub body, its outer armature bearing against the rigidified edge of this opening;

a hollow sleeve, whose end on the center side of the hub body surrounds the spherical laminated stop, the end being locked to the internal rigid armature of the spherical laminated stop, the sleeve, at its end on the side opposite the center of the hub body, and on one of its side faces, also being provided with means for connecting an elastic return and drag damper brace of the blade, the other end of the brace being connected to the outer side of the rigid hub body, or possibly to the connecting sleeve of a neighbouring blade;

a blade connecting and pitch articulation spindle whose outer part is provided with means for rigidly connecting the foot of the blade, and whose inner part swivels on two bearings around the pitch axis inside the outer part of the sleeve, at least one of these bearings forming an axial stop that transmits from the spindle in the sleeve, the thrust loads originating from the centrifugal forces on the blade;

a pitch lever rigidly locked to the spindle.

In the embodiment of the invention, the bearing formed by the axial stop is either the bearing located closest to the center of the hub body or the one located furthest from the center of the hub body. In addition, the pitch lever can be installed either at the inner end of the blade connecting and pitch articulation spindle or at the outer end of the blade connecting and pitch articulation spindle.

The invention also provides a beating bottom thrust stop for each blade, which is mounted under the sleeve on the side of the hub body, and which supports the blade carrying sleeve when it is at a standstill or turning at low speed.

Advantageously, in accordance with the invention, the means for attaching each long elastic return and drag damper element of each blade includes a yoke in which is mounted the corresponding articulated end of the long element. The means for attaching each long element or elastic return and damping brace to the body of the hub or the connecting sleeve of a neighbouring blade comprise a yoke in which the corresponding articulated end of the brace is mounted. Moreover, the articulation axes of the ends of each elastic return and damping brace are preferentially perpendicular in relation to each other.

In order to best meet the objectives of the invention, the bearing of the spindle is an axial laminated conical thrust stop which simultaneously forms the inner articulation bearing and the retaining component for the centrifugal forces of the shaft in the sleeve.

Preferentially, each spherical laminated thrust stop is mounted in the articulated rotor head, in accordance with the invention, in such a way that the end of the corresponding hollow sleeve, located on the side of the center of the hub body, is rigidly locked to the inner armature of the spherical laminated thrust stop. This assembly is achieved by means of at least two bolts, which each penetrate into a bore hole made in the end of the sleeve, and into a corresponding bore hole in the inner armature, with the bore holes being aligned along axes that are substantially parallel to the rotor axis. In order to improve this assembly, the end of the hollow sleeve, located on the side of the center of the hub body, is provided with a shoulder that is substantially perpendicular to the axis of the sleeve, and which cooperates with a shoulder of complementary matching shape made on each of the two sides of the inner armature facing it, in such a way as to support the forces exerted in the axial direction and relieve the connecting bolts to the same extent.

In accordance with the invention, the outer armature of each spherical laminated thrust stop has a housing that is of a complementary matching shape with the outer rigid edge of the corresponding opening of the hub body. The outer armature of each spherical laminated thrust stop is rigidly locked to the outer rigid edge of the corresponding opening of the hub body by at least one bolt which penetrates into a bore hole made in each side of the outer armature housing, which bore holes are opposite to each other, and in a corresponding bore hole made between the outer rigid edge of the opening and the periphery of the hub body, in such a way that the bore holes are aligned along axes that are substantially parallel to the rotor axis.

The connecting and pitch articulation spindle, designed in accordance with the invention, comprises:

a substantially truncated-cone shaped circular hollow body whose inner end, on the side of the center of the hub body, which corresponds to the small base, carries a supporting cup for the conical laminated thrust stop, and whose outer end, which corresponds to the large base, is made up of a circular cylindrical part mounted in a circular cylindrical bearing surface of the sleeve with sufficient play to allow free rotation of the spindle in the sleeve. The outer end of the hollow body comprises the circular cylindrical part which is extended by:

a base located outside the sleeve, this base being the outer part of the spindle which is provided with means, in the form of a double yoke, for rigidly connecting the foot of the blade.

To achieve this, the lower and upper part of this base are fitted with lugs opposite to each other to form a double yoke. The rigid connection to the foot of the blade is ensured by two bolts, each mounted in a bore hole made in each of the lugs and engaging in a bore hole made in the foot of the blade, these three bore holes being arranged so that the corresponding axis is substantially parallel to the axis of the rotor.

More precisely, in accordance with the invention, the inner end of the connecting and pitch articulation spindle, which is formed by the inner end of the hollow body, is made in the form of a circular cylindrical rod with grooves around its periphery, which cooperate with the grooves made in a central hole belonging to the cup; the dimensions of the rod, central hole, and the two series of grooves are such that the cup is rigidly locked in rotation with the rod, the cup being held in its axial position on the rod by locking means. These means for locking the cup and rod include a nut screwed on a threaded end of the rod, which presses the cup against a shoulder made on the outside of the grooves. The pitch lever is mounted on the support cup of the conical laminated thrust stop, to which it is rigidly locked to form a single monoblock part.

In accordance with this embodiment of the invention, the conical laminated thrust stop has an inner armature which consists of the support cup, and an outer armature which is mounted and solidly locked inside the sleeve in its outer part located on the side of the axis of the rotor, the center of the cone of the thrust stop being located on the side of the center of the rotor.

The hollow sleeve, in accordance with the invention, comprises:

an outer part made up of a tube whose outer end is provided, on the inside, with the cylindrical circular bearing surface for the connecting and pitch articulation spindle, an internal part of substantially tubular form, whose two ends face each other and are rigidly locked to the inner armature of the spherical laminated stop, the cross-section of the inner part is larger than that of the outer part, allowing the inner part to house the spherical laminated stop, the outer armature of the conical laminated stop is mounted in the area where the outer part connects with the inner part of the sleeve.

The outer part of the sleeve is connected to the inner part of the sleeve by a shoulder comprising:

a transverse part on which the outer armature of the conical laminated stop bears, and a circular inner part in which the outer armature of the conical laminated stop is centered, so that the connecting and pitch articulation spindle and the sleeve are located on the same axis. The inner part of the sleeve contains two lateral openings arranged face to face so that the pitch lever can pass through the sleeve and deploy normally in relation to it when pitch control variations are performed.

In this structure, the hollow sleeve includes, on one of the lateral sides, in the area close to its outer end, two lugs arranged opposite to each other so as to form the yoke intended to receive the articulated end of the elastic return and drag damper brace of each blade. The two lugs and the sleeve are a single monoblock assembly, the axis of the articulated end of the brace being substantially perpendicular to the plane of the rotor.

The articulated rotor head, in accordance with the invention, is provided with a beating bottom thrust stop device for each blade, which comprises a flange mounted under each hollow sleeve. At a given negative beating angle, each of these flanges bears against the periphery of a rigid reciprocal ring held in place parallel to the plane of the rotor by clips fixed to the hub body. These clips are arranged in such a way as to give the reversible ring the possibility of limited deployment in its own plane. The flange is fixed under the corresponding sleeve by the fixing bolts of the inner armature of the spherical laminated stop.

The central hub body of the articulated rotor head, in accordance with the invention, comprises a plate which is perpendicular to the axis of the rotor. The plate is connected to the upper part of the drive shaft by means of a central tubular part with which it forms a single piece, and has a substantially circular periphery as well as openings in which the spherical laminated stops of the blades are housed. Each opening has an outer edge located on a plane parallel to the axis of the rotor which extends in the radial direction of the hub from the central part of the hub to within a short distance of the periphery. The plate comprises at its periphery, in each of the areas between two neighbouring spherical laminated stops, two lugs arranged opposite to each other in such a way as to form the yoke intended to receive the elastic return and drag damper brace of the corresponding blade, the axis of the articulated end of the brace being substantially parallel to the plane of the rotor.

The articulated rotor head for gyroplanes, in accordance with the invention, therefore presents the main characteristic of having a blade connecting spindle, which acts as the intermediary component between the sleeve of the hub and the blade. This blade connecting spindle follows the beating and drag movements of the sleeve, and is connected to this sleeve by means of an elastomer, laminated, axial, conical stop, which permits by torque, variations of incidence on the spindle by making them independent of the sleeve.

The pitch lever is rigidly locked to the shaft, either on the blade attachment side, or preferably on the conical pitch thrust stop side. This addition of a pitch articulation offers the advantage of limiting the increase in mass, which would result from the need to improve the endurance of the spherical laminated stop and to strengthen the means of attaching the elastic brace (assuming that the possible overall dimensions allow this) in response to the development of rotating wing aircraft over the coming years, which will certainly result in enhanced in-flight performance, particularly with respect to speed.

To meet these new requirements, the articulated rotor head for gyroplanes, in accordance with the invention, presents a certain number of important advantages. First of all, the number of functions that the spherical laminated stop has to ensure is greatly reduced, since it is now only concerned by a part of the incidence variations, and this in function of the relative torque elasticities of the spherical thrust stop itself and the conical thrust stop. Moreover, the sleeve is now only concerned with limited movements in pitch variation, which facilitates its installation on the hub and which allows a reduction in its overall dimensions on the side of the spherical thrust stop. A further result is the much reduced drag-pitch coupling at the level of the elastic brace with incorporated damper. The fastening ball joints of this brace will also be subjected to appreciably reduced movements which is beneficial for their in-service endurance. Another advantage of the invention resides in the fact that the limited movements of pitch variation of the sleeve also improves the maneuvering conditions of the rotor when at a standstill, when the sleeves rest on the reciprocal ring bottom thrust stop device. The forces exerted on this ring are in fact considerable, and the frictional force to be applied to maneuver the sleeve in these conditions is correspondingly high. In this new proposal, the shaft can be maneuvered in incidence over the whole control distance without driving the sleeve, and consequently without any friction problem at the level of the bottom thrust stop. Finally, the spherical thrust stop and conical thrust stop are arranged in the structure of the invention so as to be inside the inner part of the sleeve which has two lateral openings. Thus the spherical thrust stop and conical thrust stop are visible without dismantling, which allows their state to be easily determined, a particularly important factor for ease of inspection according to what is known as "state-related" maintenance programs.

BRIEF DESCRIPTION OF THE DRAWINGS

Additional advantages will appear hereinafter from the detailed and non-limiting description of a number of particular embodiments of the invention and from the disclosure set forth by the drawings wherein.

DETAILED DESCRIPTION OF PREFERRED EMBODIMENTS

Figure 1:
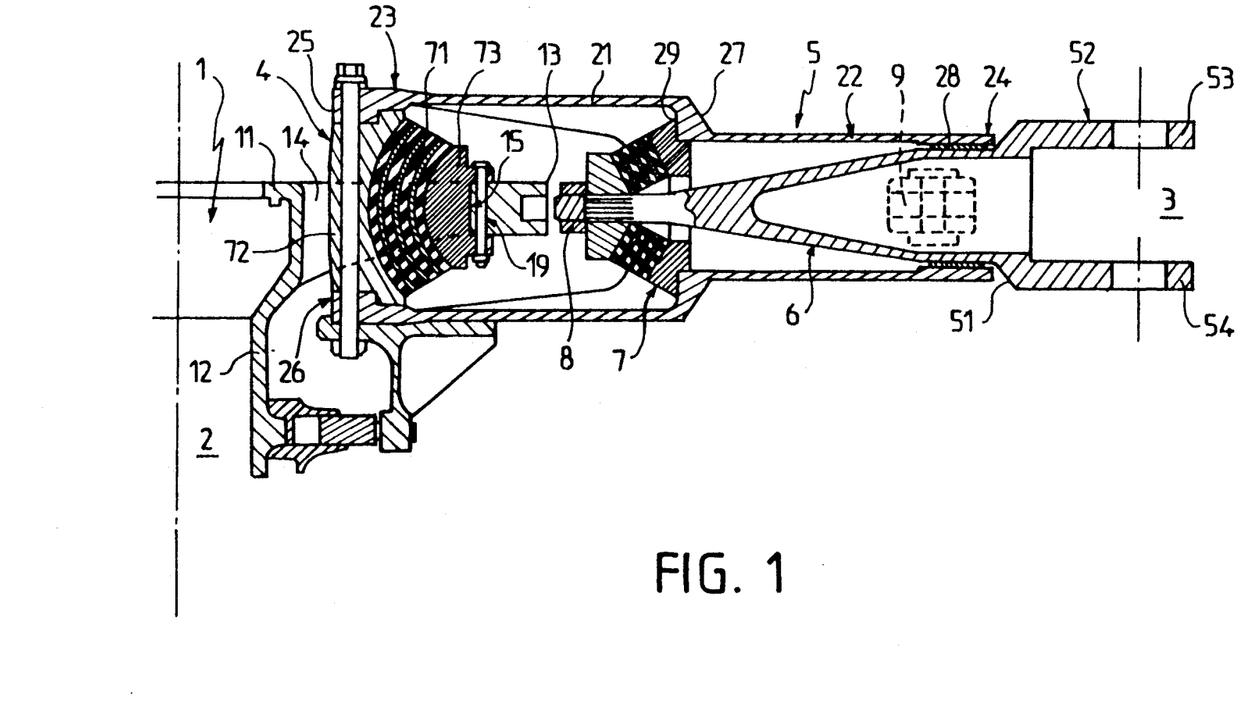
FIG. 1 is an axial sectional view of the whole device, in accordance with the invention, for the assembly of a blade of the articulated rotor, in a cross-section consisting of the axis of said blade and the axis of the drive shaft.
Figure 2:
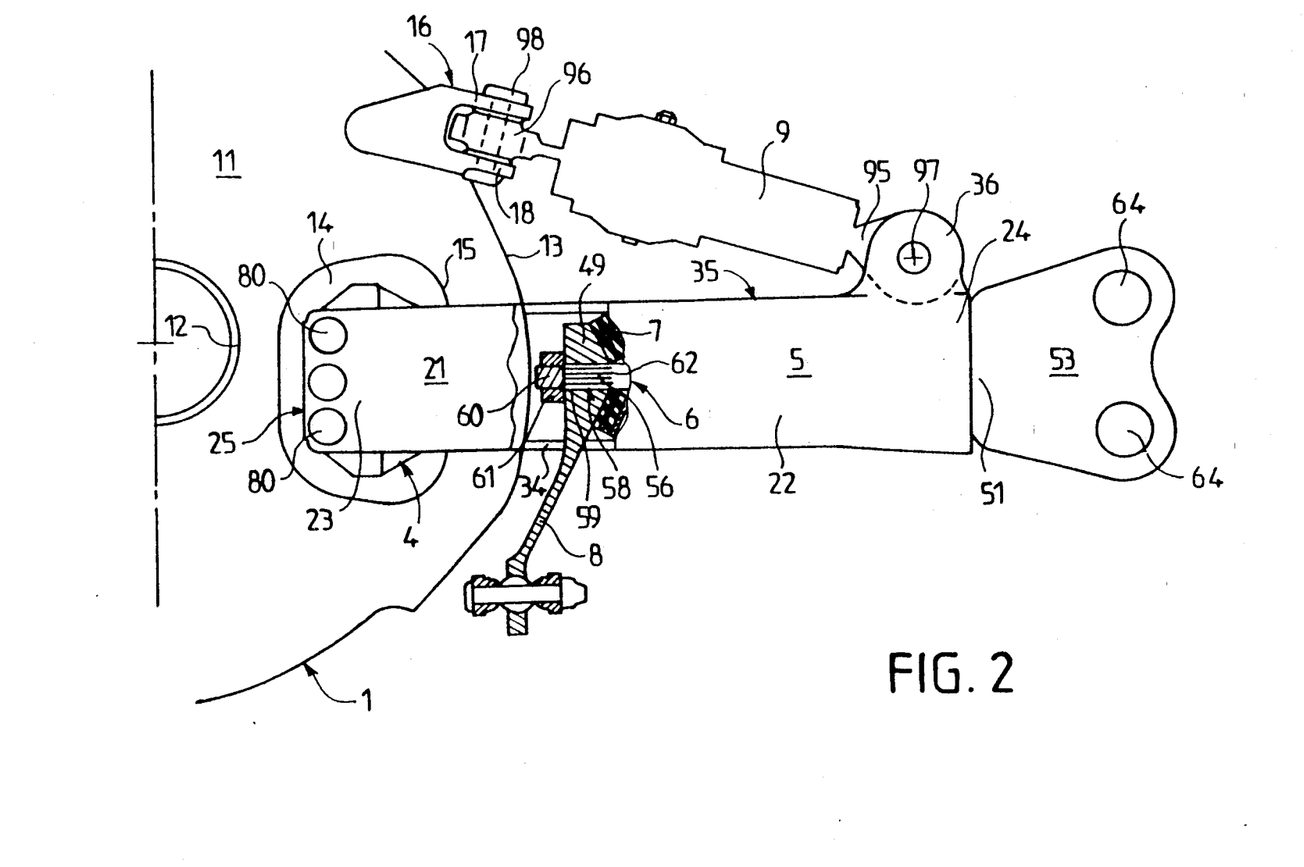
FIG. 2 is a top view of FIG. 1 showing a partial section of the pitch control.

The articulated rotor head for gyroplanes, in accordance with the invention, is shown in FIGS. 1 and 2, and includes a rigid central hub body 1, which is perpendicularly integrated with a drive shaft 2. Each blade 3 of this rotor head is radially connected to hub body 1 via connecting and articulation components.

The connecting and articulation components for each blade 3 comprise:

a spherical laminated stop 4, a hollow sleeve 5, rigidly locked to the spherical laminated stop 4, a connecting and pitch articulation spindle 6 for blade 3, rigidly locked to blade 3, a pitch lever 8 rigidly locked to spindle 6.

The spherical laminated stop 4 comprises an inner rigid armature 72 and an outer rigid armature 73, between which alternate layers of spherical and concentric elastic material and rigid material 71 are arranged. This spherical laminated stop 4 is housed in an opening 14 made in the rigid part of central hub body 1, its outer armature 73 bearing against the rigidified edge 15 of this opening 14.

Figure 2A:
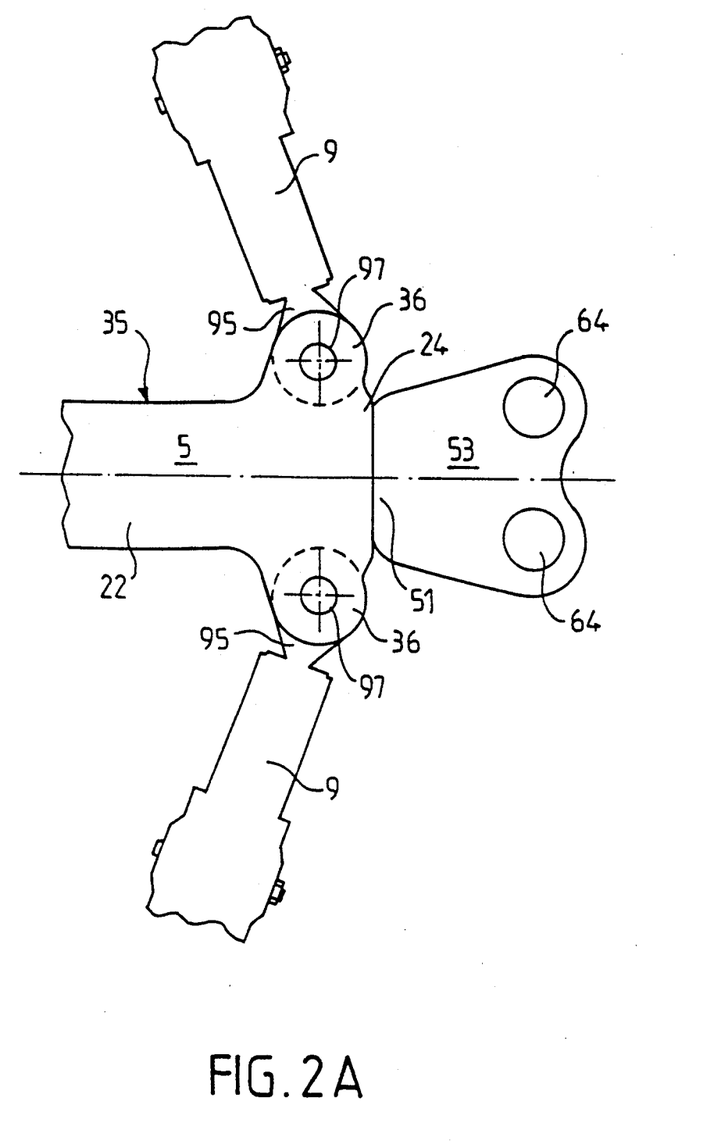

The end of hollow sleeve 5, located on the side of the center of the hub body, surrounds spherical laminated stop 4 to which it is rigidly locked by rigid inner armature 72 of this spherical laminated stop 4. The end of connecting sleeve 5 located on the side opposite the center of the hub body 1 is also provided with means for connecting an elastic return and drag damper brace 9 of blade 3. These connecting means are arranged on one of the lateral faces 35 of sleeve 5, as shown in FIG. 2. Moreover, the other end of each elastic return and drag damper brace 9 of blade 3 is connected to the outer part of rigid hub body 1. In an other embodiment of the invention, which is shown in the FIG. 2A, the other end of each brace can be connected to the outer part of connecting sleeve 5 of a neighbouring blade 3.

The connecting and pitch articulation spindle 6 of blade 3 is arranged inside sleeve 5, and comprises, in relation to the axis of drive shaft 2, an outer part and an inner part. The outer part is provided with components for rigidly connecting the foot of blade 3, and the inner part swivels about the pitch axis on the inside of the outer part of sleeve 5 on two bearings. In accordance with the invention, at least one of these bearings forms a thrust stop 7 which transmits the axial forces resulting from the centrifugal forces on blade 3 to sleeve 5 via the spindle 6.

In the embodiment shown in the Figures, the thrust stop 7 is the bearing located closest to the center of hub body 1. In an other embodiment not shown in the Figures, the thrust stop 7 is the bearing located furthest from the center of hub body 1.

The pitch lever 8, which is rigidly locked to the spindle 6, is installed at the inner end of this connecting and pitch articulation spindle 6 of blade 3. In an another embodiment which is not shown in the Figures, pitch lever 8 is installed at the outer end of the connecting and pitch articulation spindle 6 of blade 3.

Each elastic return and drag damper brace 9 of blade 3 is located between sleeve 5 and hub body 1, and has at one of its ends means for connecting with sleeve 5, and at its other end, means for connecting with hub body 1. As shown in FIG. 2, the means for connecting each elastic return and damper brace 9 with sleeve 5 comprise a yoke 36 which receives the corresponding articulated end 95 of this brace 9, the assembly being joined together by articulation axis 97. The means for connecting each elastic return and damper brace 9 with hub body 1 comprise a yoke 16 which receives end 96 corresponding to this brace 9, the assembly being joined together by articulation axis 98. In accordance with the invention, articulation axes 97 and 98 of the ends 95 and 96 of each elastic return and damper brace 9 are perpendicular to each other. This makes for improved stability of the damper for compression displacements, and better working of the spherical laminated thrust stop, since it is not subjected to pitch movements, all angular movements being transferred to the pitch articulation provided for this purpose.

Finally, in accordance with the invention, when the articulated rotor head is applied to a holding rotor head, it comprises a bottom beating thrust stop device. This device is arranged under sleeve 5 on the side of hub body 1, and essentially supports sleeve 5, i.e. the corresponding blade 3, when the rotor is at a standstill or turning at low speed.

The central hub body 1 of the articulated rotor head, in accordance with the invention, comprises a plate 11 perpendicular to the rotor axis as shown in FIGS. 1 and 2. The central hub body 1 is connected to the upper part of drive shaft 2 by a central tubular part 12. The plate 11, the central tubular part 12 and the upper part of the drive shaft 2 form a single piece. The plate 11 has a substantially circular periphery 13 having openings 14 each arranged in the axis of a corresponding blade 3. Each of these openings 14 houses the corresponding spherical laminated stop 4, and therefore each opening 14 has an outer edge 15 located in a plane parallel to the axis of the rotor. In addition, each opening 14 extends in the radial direction of the hub, from the central part 12 of this hub to a short distance from periphery 13.

The means for connecting the elastic return and drag damper brace 9 of the corresponding blade are located in each area between two neighbouring spherical laminated stops 4. These means comprise two lugs 17 and 18 respectively, located opposite to each other on plate 11 of central hub body 1. These two lugs 17 and 18 are arranged so as to form yoke 16 which receives articulated end 96 of the corresponding brace 9. To achieve this, end 96 of this brace 9 is mounted on an articulation axis 98, which is itself mounted and supported in the two lugs 17 and 18. In this configuration, axis 98 of articulated end 96 of brace 9 is substantially parallel to the plane of the rotor.

The means 36 for connecting this elastic return and drag damper brace 9 of blade 3 with hollow sleeve 5 comprise two lugs 37 and 38 located opposite to each other on the outside of hollow sleeve 5. More precisely, these two lugs 37 and 38 are located on one of the lateral sides 35 of this sleeve 5, and are located in an area close to its outer end 24 in relation to the axis of the rotor. These two lugs 37 and 38 form the yoke 36 which receives articulated end 95 of brace 9. To achieve this, the two lugs 37 and 38 support an articulation axis 97 on which pivots the articulated end 95 of brace 9. In addition, axis 97 is substantially perpendicular to the plane of the rotor. In the case of the embodiment shown in FIG. 2A, the means 36 for connecting the elastic return and drag damper 9 to the hollow sleeve are duplicated on both sides 35 of the sleeve 5.

The hollow sleeve 5, mounted on hub body 1 by means of spherical laminated stop 4, and which is connected to the corresponding blade 3 by the connecting and pitch articulation spindle 6, comprises an outer part 22 and an inner part 21, so named for their relative positions in relation to the axis of drive shaft 2. The outer part 22 comprises a tube, and the inner part 21, which is substantially tubular in shape, has a cross section that is larger than that of outer part 22, so that it can house the corresponding spherical laminated stop 4.

The outer end 24 of outer part 22 is provided with a circular cylindrical component 28 on the inside of the tube. This circular component 28 forms the outer bearing of the connecting and pitch articulation spindle 6. The inner part 21 is substantially tubular in shape and has two end members 25 and 26 which are opposite to each other. These two end members 25 and 26 are rigidly locked to inner armature 72 of the spherical laminated stop 4. The inner part 21 is connected to the outer part 22 by a connecting area 27, on the inside of which is formed a shoulder 29 and on which the conical laminated thrust stop 7 of the connecting and pitch articulation spindle 6 is mounted.

The inner part 21 of the sleeve 5 contains two lateral openings 34 arranged face to face and defined by the two end members 25, 26 so that the pitch lever 8 can pass through the sleeve 5 and deploy normally in relation to it when pitch control variations are performed.

The hollow sleeve 5 is connected to the central hub body 1 by means of the spherical laminated stop 4, the inner armature 72 of which is rigidly locked to sleeve 5, and whose outer armature 73 is rigidly locked to plate 11 of the central hub body 1.

End 23 of hollow sleeve 5, located on the side of the center of hub body 1, is rigidly locked by three bolts 80 to the inner armature 72 of the corresponding spherical laminated stop 4. To achieve this, the inner armature 72 of the spherical laminated stop 4 is mounted between the end members 25 and 26 of sleeve 5. Bore holes 32 and 33 are made respectively in each of end members 25 and 26 of sleeve 5, and are arranged so as to be directly opposite to each other and form a continuing axis to allow the introduction of fixing bolt 80. Inner armature 72 also has a corresponding bore hole 76 which is arranged to align with the corresponding bore holes 32 and 33 of end members 25 and 26 so as to form an axis which is substantially parallel to the rotor axis. This results in three groups of bore holes in which the three fixing bolts 80 are mounted so as to secure sleeve 5 to the corresponding spherical laminated stop 4. In addition, with reference to FIG. 3, the two end members 25 and 26 of hollow sleeve 5, located on the side of the center of hub body 1, are each provided with a shoulder 39 for end member 25 and a shoulder 40 for end member 26. These two shoulders 39 and 40 are substantially perpendicular to the axis of sleeve 5, and cooperate with a corresponding shoulder 74 and 75, made on each of the two sides of inner armature 72 facing it. Each of these shoulders 74 and 75 is of a complementary matching shape with shoulders 39 and 40, so as to support the forces exerted in the axial direction and relieve to the same extent the forces exerted on fixing bolts 80 located between inner armature 72 and the two end member 25 and 26 of sleeve 5.

Figure 3:
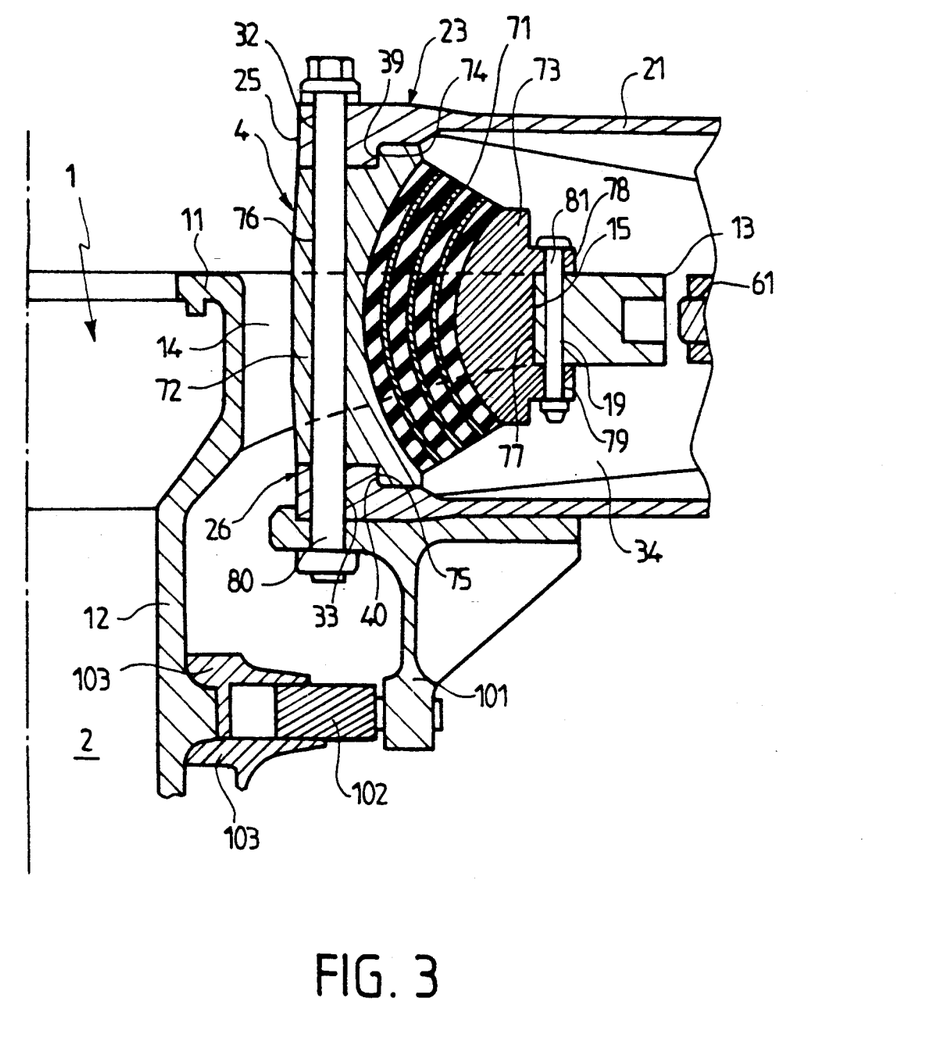
FIG. 3 is a large scale view of the central part of FIG. 1.

Each of the spherical laminated stops 4 is rigidly locked to the central hub body 1 by its outer armature 73. As shown in FIG. 3, each spherical laminated stop 4 has a housing 77 which is of complementary matching shape with the outer rigid edge 15 of the corresponding opening 14 of the central hub body 1. In this way, the spherical laminated stop 4 can engage in plate 11 of the central hub body 1 by means of its outer armature 73. Plate 11 of the hub body is rigidly locked to spherical laminated stop 4 by means of bolts 81 which lock the spherical laminated stop 4 to plate 11, bringing housing 77 of the outer armature 73 to bear against the outer rigid edge 15 of plate 11. To achieve this, a series of bore holes 78 and 79 are made in each side of housing 77 of outer armature 73, these series of bore holes being opposite to each other and being aligned. In addition, a corresponding bore hole 19 is made between the outer rigid edge 15 of opening 14 and the outer periphery 13 of the central hub body 1. These bore holes are all arranged so that each series of two bore holes 78 and 79 and one bore hole 19 are aligned along an axis running substantially parallel to the axis of the rotor.

Figure 4:
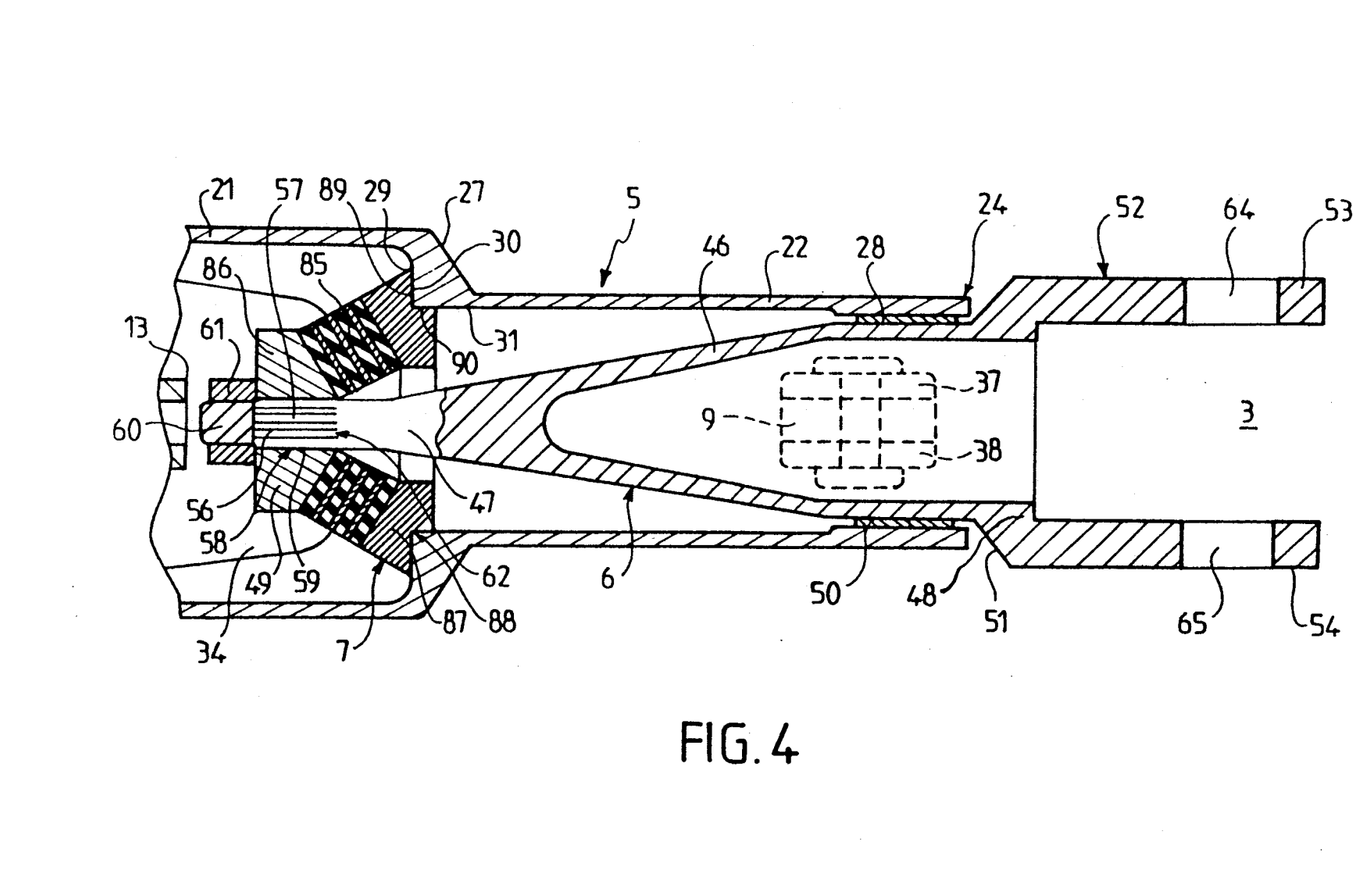
FIG. 4 is a large scale view of the outer part of FIG. 1.

The sleeve 5, in accordance with the invention, is connected to the corresponding blade 3 by the connecting and pitch articulation spindle 6. With reference to FIG. 4, this spindle 6 comprises:

a hollow body 46 of which the inner end 47 on the side of the center of hub body 1 is connected to pitch lever 8, and of which outer end 48 is extended by:

a base 51 which is provided with means for rigidly connecting to the foot of corresponding blade 3, in the form of a double yoke 52.

As shown in FIG. 4, the hollow body 46 is in the form of a substantially circular truncated-cone of which the small base corresponds to inner end 47, the large base consisting of a circular cylindrical part 50. This circular cylindrical part 50 mounts in the circular cylindrical bearing surface 28 of hollow sleeve 5 with sufficient play to allow this spindle 6 to rotate freely in sleeve 5. The outer end 48 of the hollow body 46 comprises base 51, which has at its lower part and at its upper part respectively, a lug 53 and a lug 54, which face each other to form double yoke 52. As shown in the Figures, the lugs and the sleeve form a monoblock piece. The rigid connection to the foot of blade 3 is ensured by two axes which are both mounted in a series of bore holes 64 and 65 made in each of lugs 53 and 54, and in a bore hole made in the foot of blade 3. These three bore holes are arranged in such a way that the axis they form is substantially parallel to the axis of the rotor.

The inner end of connecting and pitch articulation spindle 6 comprises inner end 47 of the hollow body 46, and is provided in the form of a circular cylindrical rod 56. This circular cylindrical rod 56 comprises, at its periphery, grooves 57 destined to receive thrust stop 7. In addition, this rod 56 is extended by a threaded end 60.

The thrust stop, in accordance with the embodiment shown in the Figures, is a conical laminated thrust stop which simultaneously forms the inner articulation bearing and the holding component which opposes the centrifugal forces of spindle 6 in sleeve 5. This conical laminated thrust stop 7 has an inner armature 86 and an outer armature 87. The outer armature 87 mounts in shoulder 29 of sleeve 5 in connecting area 27. To achieve this, the outer armature 87 is provided with a shoulder 88 having a circular outer face 90 and a transverse bearing face 89. Also, the shoulder 29 of sleeve 5 is formed by a transverse part 30 and by a circular inner part 31. The conical laminated thrust stop 7 is thus mounted in sleeve 5 by means of its circular face 90 which engages and centers itself in the circular inner part 31, until outer armature 87 bears against the transverse bearing surface 30 of sleeve 5 by means of its transverse bearing face 89. In addition, inner armature 86 of conical laminated thrust stop 7 comprises a cup 49 in which a central hole 58 is made comprising grooves 59. The inner end 47 of the connecting and pitch articulation spindle 6 mounts in cup 49 by means of its rod 56, grooves 57 working with grooves 59 of hole 58 until end 47 comes to bear against cup 49 by means of shoulder 62 located at the end of grooves 57. The means for locking this cup 59 onto rod 56 comprise a nut 61 which screws onto end 60 of rod 56 thereby pressing cup 49 against shoulder 62 made on the outside of grooves 57. Thus the inner bearing of the connecting and articulation pitch spindle 6 of blade 3 in sleeve 5 includes conical laminated thrust stop 7 which is arranged between inner end 47 of this connecting and pitch articulation spindle 6 and sleeve 5.

This conical laminated thrust stop 7 comprises two armatures, inner armature 86 and outer armature 87, both of which are rigid and between which are placed alternate conical and concentric layers of elastic material and rigid material to form central part 85.

The pitch lever 8 is mounted on support cup 49 of the conical laminated thrust stop 7 with which it is rigidly locked so as to form a single monoblock piece. As a result, the conical laminated thrust stop 7 comprises inner armature 86 consisting of the support cup 49 belonging to pitch lever 8, and outer armature 87 which is mounted and rigidly locked inside sleeve 5 in the outer part 22 of the latter, which is located on the side of the axis of the rotor. The center of the cone of the central part 85 of this conical laminated thrust stop 7 is located on the side of the center of the rotor. In addition, owing to this constructional method, connecting and articulation pitch spindle 6 and sleeve 5 have the same axis.

The articulated rotor head for gyroplanes, in accordance with the invention, also has a bottom thrust stop device which comprises flange 101 mounted under each hollow sleeve 5. For any given angle of negative beating, each flange 101 bears against the periphery of a reciprocal rigid ring 102. This reciprocal ring 102 is held in place parallel to the plane of the rotor by means of clips 103 which are fixed to the central hub body 1. These clips 103 are arranged so as to allow reciprocal ring 102 a limited range of deployment in its own plane. Each flange 101 is fixed under the corresponding sleeve 5 by means of fixing bolts 80 which secure inner armature 72 of the spherical laminated stop 4 to the hollow sleeve 5.

What is claimed is that:

1. Articulated rotor head for gyroplanes having a drive spindle and plural blades, said head comprising a central rigid hub body perpendicularly integrated with the drive spindle and having a plurality of openings made therein, a center, and a rotational axis, each blade being radially fixed to said hub body by a connecting and articulating device, wherein each said device comprises:

a spherical laminated elastomeric stop comprising an outer rigid armature, an inner rigid armature, and alternate concentric and spherical layers of elastic and rigid materials arranged between said outer and inner armatures, said stop being housed in one said opening made in said central hub body, said outer armature bearing against a rigidified edge of said opening;

a hollow sleeve having one end on a center side of the hub body housing the spherical laminated stop, said one end being locked to said inner rigid armature of said spherical laminated stop, said sleeve having another end on the side opposite the center of the hub body, side faces, and means at said another end on one of said side faces for connecting an end of an elastic return and damping brace of the blade;

a connecting and pitch articulation spindle for the blade having an outer part provided with means for rigidly connecting to a foot of the blade, and an inner part mounted to swivel around a pitch axis on two bearings inside said another end of the sleeve, one of said two bearings forming an thrust stop that transmits from said spindle in the sleeve the thrust loads originating from centrifugal forces on the blade;

a pitch lever rigidly locked to said connecting and pitch articulation spindle.

2. Articulated rotor head as claimed in claim 1, wherein said thrust stop is the bearing of said two bearings located closest to the center of the hub body.

3. Articulated rotor head as claimed in claim 2, wherein said another end of said sleeve has an inner circular cylindrical bearing surface; said thrust stop is a conical laminated thrust stop; and the connecting and pitch articulation spindle comprises:

a substantially truncated-cone shaped circular hollow body forming said inner part of said spindle and having an inner end, on the side of the center of the hub body, carrying a supporting cup of the conical laminated thrust stop, and an outer end made up of a circular cylindrical part mounted in said circular cylindrical bearing surface of the sleeve with sufficient play to allow free rotation of the spindle in the sleeve, and a base located outside the sleeve forming said outer part of the spindle.

4. Articulated rotor head as claimed in claim 3, wherein said means for rigidly connecting to a foot of the blade comprises a double yoke formed on said base.

5. Articulated rotor head as claimed in claim 4, wherein said base has a lower and an upper part, said double yoke comprises two lugs, the two lugs being on said lower part and upper part of said base facing each other, the rigid connection to the foot of the blade being ensured by two bolts, each bolt being mounted in a bore hole made in each of the lugs, and engaging in a bore hole made in the foot of the blade, said bore holes being arranged so that a corresponding axis is substantially parallel to the rotational axis of the hub body.

6. Articulated rotor head as claimed in claim 3, wherein the inner end of the hollow body is a circular cylindrical rod with grooves around its periphery which cooperate with grooves made in a central hole of the supporting cup; the dimensions of the rod, central hole and the grooves in the central hole and the grooves on the rod being such that the cup is rigidly locked in rotation with the rod, said cup being held in its axial position on the rod by means for locking.

7. Articulated rotor head as claimed in claim 6, wherein the means for locking the cup on the rod includes a threaded end on said rod, a nut matching the threaded end of the rod and a shoulder made on the outside of the grooves on said rod, said nut being threaded on said threaded end and pressing the cup against the shoulder.

8. Articulated rotor head as claimed in claim 6 wherein the pitch lever is mounted on and rigidly locked to the supporting cup of the conical laminated thrust stop.

9. Articulated rotor head as claimed in claim 8, wherein the pitch lever and the cup form a single monoblock piece.

10. Articulated rotor head as claimed in claim 8, wherein the hollow sleeve has an inner part having two lateral openings arranged face to face so that the pitch lever can pass through the sleeve and deploy normally in relation to the sleeve when pitch control variations are performed.

11. Articulated rotor head as claimed in claim 3, wherein the conical laminated thrust stop has an inner armature which consists of the supporting cup, and an outer armature which is mounted and solidly locked inside the sleeve a center of a cone of said thrust stop being located on the side of the center of the hub body.

12. Articulated rotor head as claimed in claim 3, wherein the hollow sleeve comprises:
an outer part made up of a tube having an outer end provided with the inner cylindrical circular bearing surface for the connecting and pitch articulation spindle, and
an inner part of substantially tubular form having two end members facing each other, said end members being rigidly locked to the inner armature of the spherical laminated stop;
the inner part having a cross-section larger than a cross-section of the outer part, the inner part housing the spherical laminated stop,
the conical laminated thrust stop having an outer armature mounted in a connecting area where the outer part connects with the inner part of the sleeve.

13. Articulated rotor head as claimed in claim 12, wherein the connecting area between the outer part and the inner part of the sleeve includes a shoulder comprising:
a transverse part on which the outer armature of the conical laminated thrust stop bears, and
a circular inner part in which the outer armature of the conical laminated thrust stop is centered, so that the connecting and pitch articulation spindle and the sleeve are coaxial.

14. Articulated rotor head as claimed in claim 1, wherein the pitch lever is provided at an inner end of the connecting and pitch articulation spindle of the blade.

15. Articulated rotor head as claimed in claim 1, further comprising a bottom thrust stop system, arranged under the sleeve on a side of the hub body, supporting said sleeve when the rotor head is at a standstill or turning at low speed.

16. Articulated rotor head as claimed in claim 15, wherein the bottom thrust stop device comprises a flange mounted under each hollow sleeve, each of said flanges, at a given negative beating angle, bearing against a periphery of a rigid reciprocal ring held in place parallel to a plane of rotation of the rotor head by clips fixed to the hub body, said clips being arranged in such a way as to give said ring limited deployment in a plane of said ring.

17. Articulated rotor head as claimed in claim 16, wherein said flange is fixed under the corresponding sleeve by fixing bolts associated with said inner armature of the spherical laminated thrust stop.

18. Articulated rotor head as claimed in claim 1, wherein the means for connecting the end of the elastic return and damper brace at a sleeve end of said brace comprises a first yoke on said one of said side faces in which a corresponding articulated end of said brace is mounted.

19. Articulated rotor head as claimed in claim 18, wherein the means for connecting each the end of the elastic return and damping brace further comprises a second yoke in which an end of an another said brace is mounted.

20. Articulated rotor head as claimed in claim 19, wherein said second yoke is aligned such that an axis of end of the another said brace is substantially parallel to a plane of rotation of the rotor head.

21. Articulated rotor head as claimed in claim 18, wherein articulation axes of opposite ends of each elastic return and damping brace are perpendicular in relation to each other.

22. Articulated rotor head as claimed in claim 18, wherein said first yoke comprises two lugs arranged face to face on said one of said side faces of said another end of said hollow sleeve.

23. Articulated rotor head as claimed in claim 22, wherein the two lugs and the sleeve are a single monoblock piece.

24. Articulated rotor head as claimed in claim 22, wherein the axis of the end of the brace is substantially perpendicular to a plane of rotation of the rotor head.

25. Articulated rotor head as claimed in claim 1, wherein the thrust stop is a conical laminated thrust stop, which simultaneously forms an inner articulation bearing and a retaining component for centrifugal forces acting on the spindle in the sleeve.

26. Articulated rotor head as claimed in claim 1, wherein said one end of the hollow sleeve is formed as two end members and is rigidly locked to the inner armature of the corresponding spherical laminated stop, by at least two bolts, which each penetrate into a bore hole made in each said end member of the sleeve, and each into a corresponding bore hole made in the inner armature, in such a manner that said bore holes are aligned along axes that are substantially parallel to the rotational axis of the hub body.

27. Articulated rotor head as claimed in claim 26, wherein each of the two end members of the hollow sleeve is provided with a shoulder that is substantially perpendicular to the axis of the sleeve, and which cooperate with a shoulder of complementary matching shape made on each of two sides of the inner armature facing said shoulders of said end members in such a way as to support the forces exerted in an axial direction of said sleeve and relieve said at least two bolts to the same extent.

28. Articulated rotor head as claimed in claim 1, wherein said outer armature of each spherical laminated stop has a housing that is of complementary matching shape with the rigidified edge of said opening of the hub body.

29. Articulated rotor head as claimed in claim 28, wherein said outer armature of each spherical laminated stop is rigidly locked to said rigidified edge of said opening of the hub body, by at least one bolt which penetrates into a bore hole made in each side of said housing of the outer armature, and in a corresponding bore hole made between the rigidified edge of the opening and a periphery of the hub body, in such a way that said bore holes are aligned along an axis that is substantially parallel to the rotational axis of the hub body.

30. Articulated rotor head as claimed in claim 1, wherein the central hub body comprises a plate perpendicular to the axis of the rotor head connected to an upper part of the drive spindle by a central tubular part, said central hub body and said central tubular part forming a single piece, the plate having a substantially circular periphery and said openings in which the spherical laminated stops for the blades are housed, each opening having an outer edge located on a plane parallel to the axis of the rotor head, and extending in a radial direction of the hub, from a central part of the hub to within a short distance of the periphery.

31. Articulated rotor head as claimed in claim 30, wherein the plate comprises at its periphery, in each of the areas between two neighboring spherical laminated thrust stops, two lugs arranged facing each other, in such a way that these two lugs form a yoke receiving the other end of the corresponding brace.

* * * * *